M. S. Marshall.

Washing Mach. Cylinder.

N° 94,499. Patented Sept. 7, 1869.

Witnesses.
F. H. Howard
Saml. J. Marr

Inventor.
M. S. Marshall
by Prindle & Dyer
att'ys

United States Patent Office.

MOSES S. MARSHALL, OF SOMERVILLE, ASSIGNOR TO JOHN T. AND JOHN S. FOLSOM, OF BOSTON, MASSACHUSETTS.

Letters Patent No. 94,499, dated September 7, 1869.

IMPROVED WASHING-MACHINE.

The Schedule referred to in these Letters Patent and making part of the same.

*To all whom it may concern:*

Be it known that I, MOSES S. MARSHALL, of Somerville, in the county of Middlesex, and State of Massachusetts, have invented certain new and useful Improvements in Washing-Machines; and do hereby declare that the following is a full, clear, and exact description thereof, reference being had to the accompanying drawing, making a part of this specification, in which—

Letters of like name and kind refer to like parts in each of the figures.

Figure 1:
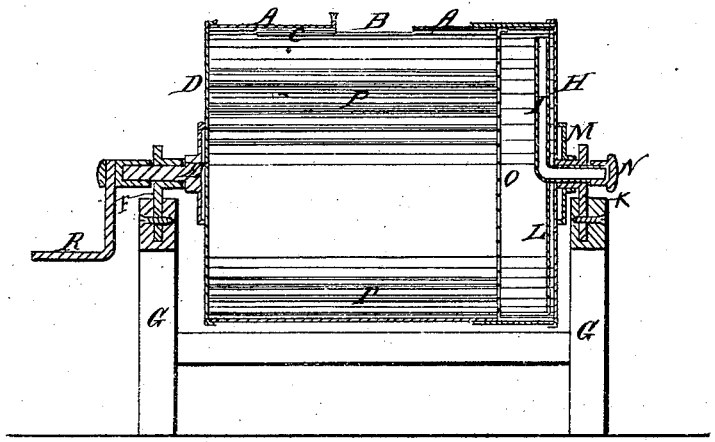
Figure 1 is a vertical longitudinal section of my improved device.
Figure 3:
Figure 3 is an enlarged view of the valve for allowing the escape of steam.
Figure 2:
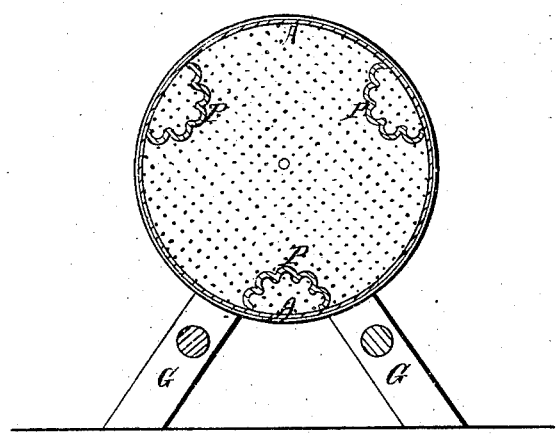
Figure 2 is a vertical cross-section of the same.

My invention relates to a class of washing-machines in which the clothes are cleansed by being immersed in water, having a high degree of temperature, and the whole caused to rotate; and It consists, principally, in the employment of a valve, constructed as hereinafter described, for permitting the surplus steam to escape; and, further, in the peculiar construction and arrangement of the various parts of the device, for the purpose of producing a more desirable machine, and a more perfect result.

In the annexed drawing—

A represents a cylinder, of sheet-metal, with an opening, P, in its side, which opening is closed by a slide, C, suitably packed at its edges, so as to produce a water-tight joint.

One end, D, of the cylinder is solid, and has secured to and projecting from its centre a metal journal, E, which has a bearing within a box, F, secured to the supporting frame G, while the opposite end, H, has an opening, through which passes a pipe, I, that serves as a journal for that end of said cylinder.

The pipe I, outside of the cylinder, is secured within a box, K, (corresponding in shape and position with that in which the journal E has a bearing,) and from thence passes through the head or end H, and is bent upward at a right angle, its upper end being within a short distance of the shell of said cylinder.

An inner or false head, L, somewhat smaller than the cylinder, is secured to the pipe I, and is thereby held in position at a short distance from the real head H.

M represents a collar, of the shape shown, which, being secured to the end H, projects outward over the box K, and furnishes an additional bearing for said cylinder, and also forms a stuffing-box, for the reception of sufficient packing to insure a water-tight joint between the pipe and said end or head H.

The outer end of the pipe I is provided with a male screw-thread, upon which is snugly fitted a nut, N, covered at its outer end.

One or more holes, $x$, are drilled through both nut and pipe, which holes, when said nut is turned so as to make them correspond, open a communication through said pipe with the interior of the cylinder, and permit the escape of any steam that may be given off from the boiling water.

In order that the nut or valve may be more readily opened or closed, a pin, $x'$, is secured to and projects outward from the pipe, and fits into a recess in the end of said nut, the length of said recess being such as that when said nut is turned in one direction as far as said pin will permit, the passage $x$ will be closed, and when turned in the opposite direction said passage will be open.

It will be readily seen that the peculiar construction of this nut or valve permits the passage $x$ to be instantly opened or closed, or its size adjusted so as to regulate the escape of the steam with the greatest ease.

A perforated metal head, O, placed at a short distance from the head H, for the purpose of preventing the clothes from coming in contact with the pipe I, and the usual longitudinal corrugated ribs P, secured at equidistant points upon the inside of the cylinder, completes the device, which is operated as follows:

The clothes to be cleansed are placed within the cylinder, together with a sufficient quantity of boiling suds, the slide closed, and said cylinder rotated by means of a handle, R, secured upon the outer end of the journal E.

The ribs P produce a rolling motion of the clothes, so as to bring every portion thereof in immediate contact with the boiling suds, by which means said clothes are thoroughly cleansed without any of the customary wear and injury incident to the use of ordinary machines.

When the slide is first closed, the steam given off from the boiling water would create sufficient pressure to force said water out through the slide, unless permitted to escape, which is accomplished by turning the nut or valve N until the opening therein corresponds with that in the pipe, by which means said steam can pass outward into the open air, without allowing any portion of the water to escape.

If desired, a small furnace can be placed beneath the cylinder, and the temperature of the water kept above the boiling point, in which event the provisions made for the escape of the steam would be invaluable.

The advantages possessed by this device are—

First, the employment of the escape-pipe and valve renders practicable the use of water having a temperature at or above the boiling point, by means of which greater efficiency is secured than would otherwise be possible.

Second, the general construction and arrangement of the several parts of the device is such as to secure convenience, durability, and efficiency, at a comparatively small cost.

Having thus set forth the nature and merits of my improvement,

What I claim as new, and desire to secure by Letters Patent, is—

The construction of the hollow journal, with its aperture $x$, and cap or valve N, in combination with the angular pipe I, and the operating cylinder A, as shown and for the purpose specified.

Also, the combination of the pipe I, box K, collar M, and nut N, with the heads H and O, as shown, and for the purpose set forth.

Also, the general construction and arrangement of the hereinbefore-described device, consisting of the cylinder A, provided with the opening B, the slide C, the heads D and H, the journals E, the boxes F and K, the pipe I, the false and perforated heads L and O, the collar M, the valve N, the corrugated ribs P, and the crank R, substantially as and for the purpose specified.

MOSES S. MARSHALL.

Witnesses:
JOHN E. CRANE,
WALTER E. RICE.